(12) United States Patent
Haider et al.

(10) Patent No.: US 7,301,318 B2
(45) Date of Patent: Nov. 27, 2007

(54) CIRCUIT ARRANGEMENT FOR VOLTAGE ADJUSTMENT

(75) Inventors: Gunter Haider, Linz (AT); Christoph Mayerl, Munich (DE); Gerhard Nebel, Immenstadt (DE); Iker San Sebastian, Munich (DE); Holger Sedlak, Sauerlach (DE); Uwe Weder, Hallertau (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/340,000

(22) Filed: Jan. 25, 2006

(65) Prior Publication Data

US 2006/0232255 A1   Oct. 19, 2006

Related U.S. Application Data

(63) Continuation of application No. PCT/DE2004/001586, filed on Jul. 21, 2004.

(30) Foreign Application Priority Data

Jul. 25, 2003   (DE)   ................................ 103 34 066

(51) Int. Cl.
  *G05F 1/40*   (2006.01)
(52) U.S. Cl. ..................................................... 323/282
(58) Field of Classification Search ................ 323/268, 323/271, 272, 282, 283
  See application file for complete search history.

(56) References Cited

U.S. PATENT DOCUMENTS

| 6,236,262 | B1 | | 5/2001 | Mellot |
| 6,356,061 | B1 | * | 3/2002 | Perillo .......................... 323/274 |
| 6,424,128 | B1 | * | 7/2002 | Hiraki et al. ................ 323/268 |
| 6,559,627 | B2 | * | 5/2003 | Khouri et al. ............... 323/282 |
| 6,566,846 | B1 | | 5/2003 | Voo |
| 6,597,158 | B2 | * | 7/2003 | Umeda ......................... 323/268 |
| 6,833,742 | B2 | * | 12/2004 | Shimizu et al. ............. 327/143 |

FOREIGN PATENT DOCUMENTS

| DE | 44 42 466 C1 | 12/1995 |
| EP | 0 470 498 A2 | 2/1992 |
| EP | 0 686 903 A2 | 6/1995 |
| GB | 2 339 638 A | 2/2000 |
| WO | WO-01/71894 A2 | 9/2001 |

* cited by examiner

*Primary Examiner*—Adolf Berhane
(74) *Attorney, Agent, or Firm*—Dickstein Shapiro LLP

(57) ABSTRACT

A circuit arrangement for voltage regulation having a series regulator with a regulating amplifier and a charge pump that is connected downstream of the regulating amplifier, a reference voltage unit that generates a reference voltage for the regulating amplifier, and a starter unit that generates a starter voltage in order to supply the regulating amplifier, the charge pump, and the reference voltage unit with voltage while the series regulator is being started.

21 Claims, 2 Drawing Sheets

CIRCUIT ARRANGEMENT FOR VOLTAGE ADJUSTMENT

CROSS-REFERENCE TO RELATED APPLICATION

This application is a continuation of International Patent Application Serial No. PCT/DE2004/001586, filed Jul. 21, 2004, which published in German on Feb. 10, 2005 as WO 2005/013466, and is incorporated herein by reference in its entirety.

FIELD OF THE INVENTION

The invention relates to a circuit arrangement for voltage regulation and to a method for operating the circuit arrangement. In this case, the circuit arrangement comprises a series regulator.

BACKGROUND OF THE INVENTION

Nowadays, the on-chip operating voltages are generally lower than the voltage applied externally to the chip. Therefore, integrated voltage regulators are required on the chip in order to reduce the external voltage. The voltage regulators may be based, for example, on N-channel MOS technology. In order to be able to sufficiently increase the voltage at the gate of the output transistor—in the form of an NMOS transistor—of the voltage regulator, such series regulators additionally have a charge pump. In comparison with a PMOS transistor, an NMOS transistor as output transistor advantageously affords better suppression of the input voltage and lower sensitivity in the event of load fluctuations. Such voltage regulators may be in the form of three-point regulators, for example, although the voltage at the output of the voltage regulator has a certain ripple. With the aid of a continuous regulator, however, this ripple can be reduced and the voltage regulation can thus be improved. In principle, such circuits, which are also known by the designation low-drop voltage regulators, are designed for a particularly low voltage drop between the input and output. However, for this reason, it is disadvantageously not possible for the voltage regulator to start up independently.

The problem of the voltage regulator has hitherto been solved using a PMOS output transistor whose suppression of the input voltage and whose load behavior do not, however, satisfy the requirements. In addition, the high switch-on voltage spikes can no longer be tolerated in present-day technologies.

SUMMARY OF THE INVENTION

It is an object of the invention to specify a circuit arrangement for voltage regulation and a method for operating the circuit arrangement for voltage regulation, in which it is ensured that the voltage regulator starts up at any time.

One advantage of the invention resides in the fact that the circuit arrangement has only a low voltage drop between the input and output voltages and has good suppression of the input voltage.

The current consumption is advantageously extremely low in the proposed circuit arrangement.

The circuit arrangement for voltage regulation according to the invention has a series regulator having a regulating amplifier and a charge pump that is connected downstream of the latter. In addition, the circuit arrangement has a reference voltage unit for generating a reference voltage for the regulating amplifier and a starter unit for generating a starter voltage in order to supply the regulating amplifier, the charge pump and the reference voltage unit with voltage while the series regulator is being started.

In the method according to the invention for operating a voltage regulator, which comprises a series regulator having, in turn, a regulating amplifier and a charge pump that is connected downstream of the latter, the regulating amplifier and the charge pump are supplied, during a start phase, with a starter voltage that is generated by a starter unit. After the start phase has ended, a changeover is made to a normal operating phase by using a changeover unit to disconnect the regulating amplifier and the charge pump from the starter voltage of the starter unit and to connect them to an output voltage that is generated by the series regulator.

In one embodiment of the circuit arrangement according to the invention, the series regulator has an NMOS transistor as a series regulator transistor. This advantageously makes it possible to effect good suppression of the input voltage.

In another embodiment of the circuit arrangement according to the invention, provision is made of a controllable switching means that can be used to connect the charge pump to the starter voltage or to an output voltage that is generated by the series regulator.

In an additional embodiment of the circuit arrangement according to the invention, provision is made of a further series regulator whose terminals for the supply voltage can likewise be connected to the starter unit. The two series regulators may thus be used to supply different circuit parts of an integrated module, for example a digital circuit part and an analogue circuit part, with separate voltages. This decouples the supply voltages, which, in turn, results in the supply voltage for one circuit part becoming independent of load fluctuations in the other circuit part.

The circuit arrangement according to the invention advantageously has a second controllable switching means that can be used to connect the regulating amplifier to an output voltage that is generated by the further series regulator. This embodiment is particularly advantageous when one series regulator is connected to a small load and the further series regulator is connected to a large load or to a load that fluctuates greatly. In the proposed type of connection, load fluctuations at the output of the first series regulator are of no consequence because the voltage is not supplied to the regulating amplifier of the first series regulator with the aid of the less stable output voltage of the first series regulator but rather with the stable output voltage of the further series regulator that is subjected to a smaller load.

In addition, it is advantageous if the reference voltage unit is in the form of a bandgap circuit in the circuit arrangement according to the invention.

Moreover, the series regulator and/or the further series regulator may be in the form of (a) low-drop voltage regulator(s) in the circuit arrangement according to the invention.

In order to achieve the object, it is also proposed that the starter unit of the circuit arrangement according to the invention have a two-point regulator.

The two-point regulator of the circuit arrangement according to the invention may have, on the input side, a voltage divider having a resistor and a diode, it being possible to set the switching point of the two-point regulator using the voltage divider.

In one development of the circuit arrangement according to the invention, the two-point regulator has an inverter, which is connected to the voltage divider and has an NMOS transistor and a PMOS transistor.

According to another feature of the invention, in the case of the circuit arrangement for voltage regulation, the switching point of the two-point regulator can be set using the channel length and channel width of the two MOS transistors.

In another embodiment of the invention, the starter unit of the circuit arrangement has a deactivation component that can be used to deactivate the starter unit.

In an additional embodiment of the invention, the deactivation component is controlled using the reference voltage unit.

The circuit arrangement according to the invention can advantageously be used in an integrated controller module.

In one development of the method according to the invention, a reference voltage unit is used to compare the starter voltage with a reference voltage that is generated by the reference voltage unit, and the changeover unit is driven in a manner dependent on the result of the comparison.

Finally, in the method according to the invention, the starter unit can be deactivated after the end of the start phase. This makes it possible to eliminate potential sources of interference which may be present in the starter unit.

BRIEF DESCRIPTION OF THE DRAWINGS

The invention will be explained in further detail below using a plurality of exemplary embodiments and with reference to two figures, in which.

DETAILED DESCRIPTION OF PREFERRED EMBODIMENTS OF THE INVENTION

Figure 1:
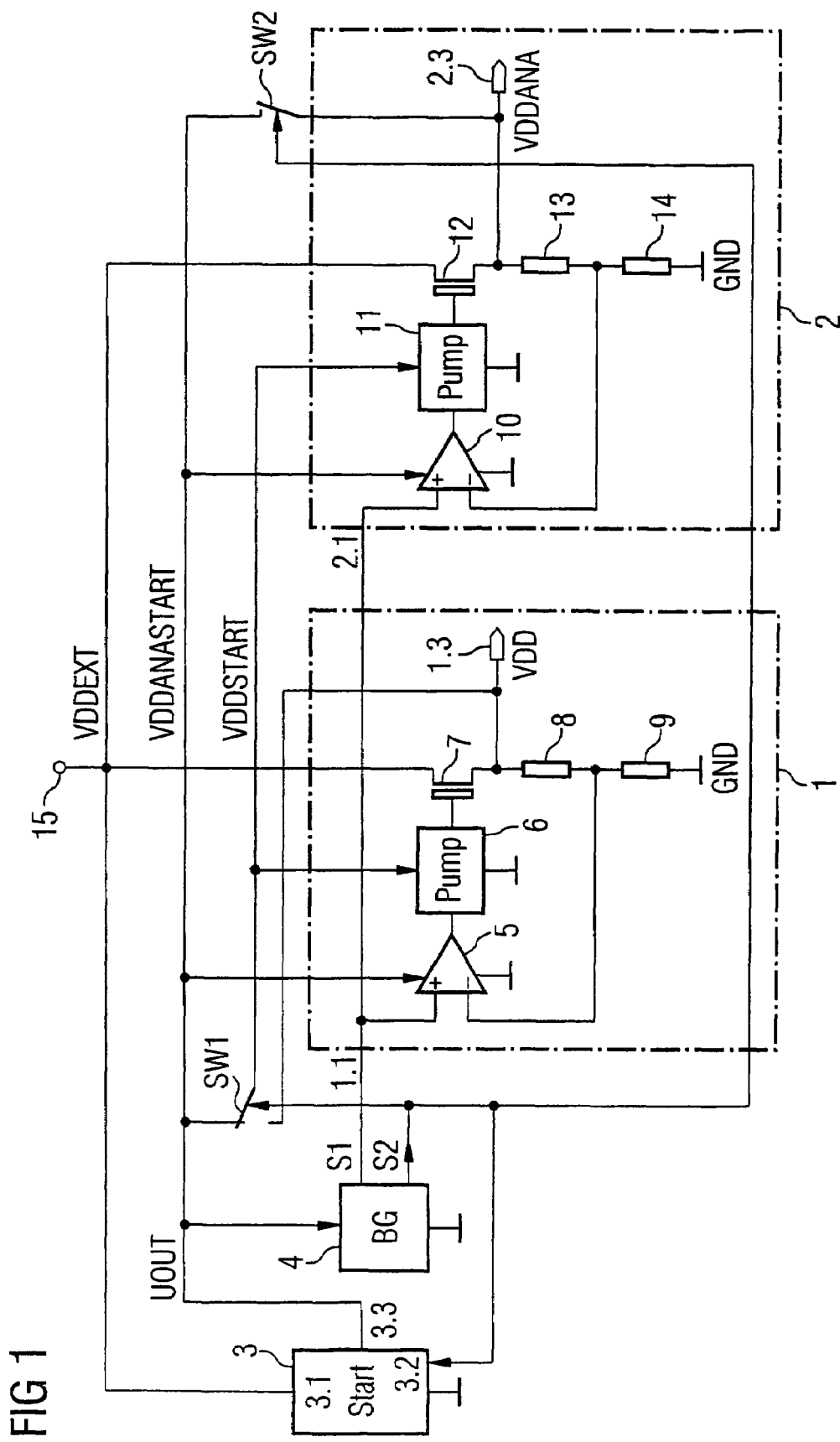
FIG. 1 shows the basic construction of one possible embodiment of the voltage regulator according to the invention having two series regulators and a starter unit for generating a starter voltage for the series regulators.

FIG. 1 illustrates the entire voltage regulator in the form of a block diagram. The external supply voltage VDDEXT is applied to the input 15. The regulated output voltage VDD for digital components and the regulated output voltage VDDANA for analogue components may be tapped off at the two outputs 1.3 and 2.3 of the two series regulators 1 and 2. In addition to a regulating operational amplifier 5 and a charge pump 6 that is connected downstream of the latter, the series regulator 1 comprises a series transistor 7 that is controlled by the charge pump 6. The series transistor 7 is connected, on the output side, between the external supply voltage VDDEXT and a voltage divider that is constructed from two resistors 8 and 9. A partial voltage that is generated by the voltage divider is fed back to the inverting input of the regulating operational amplifier 5. The construction of the series regulator 2 corresponds, in principle, to that of the series regulator 1. The bandgap reference voltage source 4 provides a reference voltage S1 and a power on signal S2 (which is also referred to as a control signal) approximately 60 μs after switch-on. The reference voltage S1 is fed to the input 1.1 of the series regulator 1 and thus to the non-inverting input of the regulating operational amplifier 5 and also to the input 2.1 of the series regulator 2 and thus to the non-inverting input of the regulating operational amplifier 10.

The invention solves the problem by virtue of the fact that the starter circuit 3 does not supply the entire voltage regulator chip with voltage but rather only the blocks which are required for the starting operation, namely the bandgap reference circuit 4, the regulating operational amplifiers 5 and 10 and the charge pumps 6 and 11. As a result, the PMOS transistor P1 that is present in the starter circuit 3 for the starting operation can be kept very small, with the result that parasitic couplings have only a minor effect on normal operation after the starter circuit 3 has been switched off. The starter circuit 3 does not have a regulating operational amplifier, with the result that there is no need for a compensation capacitor either. As a result, undesirable switch-on spikes can be largely kept away from the internal voltage. In addition, the starter circuit 3 is constructed in such a manner that it does not need a reference voltage that is not yet available at all such that it is stable during starting of the series regulators 1 and 2.

The main advantage of the invention resides in the fact that the output voltages VDD and VDDANA which are to be regulated are connected to the external input voltage VDDEXT only by means of the large NMOS transistors 7 and 12.

In the possible application—shown in FIG. 1—of the circuit arrangement according to the invention for smart cards, the voltage regulator provides two output voltages VDD and VDDANA. As a result, the supply voltage VDDANA for sensitive analogue circuits can be decoupled from the digital output voltage VDD that possibly has interference. In this application, the two output voltages VDD and VDDANA are set to the same desired value S1.

The NMOS transistors 7 and 12 operate as source followers and have considerably better suppression of the input voltage and a better load behavior than a PMOS transistor. Since an NMOS transistor needs charge on its gate to turn on, an NMOS regulator cannot start by itself. The starter circuit 3 is constructed with a PMOS transistor. In the invention, however, the starter circuit 3 supplies only the bandgap reference circuit 4, the two regulating operational amplifiers 5 and 10 and the two charge pumps 6 and 11. As a result, the PMOS transistor P1 of the starter circuit can be kept small and can be completely switched off when changing from starter operation to normal operation so that undesirable instances of the external operating voltage VDDEXT being coupled in are reduced to a minimum. The starter circuit 3 is, in principle, a type of PMOS regulator except that it does not need a regulating operational amplifier. The process of compensating for such an amplifier has always led to problematic switch-on spikes in PMOS regulators. The starter circuit 3 of this invention uses the switching threshold of the inverter INV2 and thus operates as a two-point regulator. Such a regulator is very simple in terms of circuitry, does not require any compensation, operates in a much faster manner than a regulating operational amplifier and does not need a reference voltage that is generally not yet available such that is stable during starting. The bandgap reference voltage source 4 generates the power on signal S2 that is used to change over the entire circuit from starter operation to normal operation. During normal operation, the starter circuit 3 is completely switched off, the regulating operational amplifiers 5 and 10 are supplied from the output voltage VDDANA (which has run up in the meantime) of the series regulator 2, and the charge pumps 6 and 11 are supplied from the output voltage VDD (which has run up in the meantime) of the series regulator 1.

At the beginning, that is to say immediately after the entire circuit has been switched on, the two switches SW1 and SW2 are in the position depicted in FIG. 1, with the result that the bandgap reference circuit 4 and the regulating operational amplifiers 5 and 10 are supplied with the voltage UOUT by the starter circuit 3 via VDDANASTART and the charge pumps are supplied with the voltage UOUT by the starter circuit 3 via VDDSTART. As soon as these three components are being supplied, the regulating operational amplifiers 5 and 10 detect that the output voltages VDD and VDDANA are too low and activate the charge pumps 6 and 11 which feed the gates of the NMOS transistors 7 and 12. As soon as the threshold voltages of these transistors are exceeded, the output voltages VDD and VDDANA also increase. In this case, the size of the loads at the outputs 1.3 and 2.3 is virtually insignificant since the NMOS transistors 7 and 12 operate as source followers. In addition, the loads therefore have scarcely any effect on the run-up time needed for the output voltages VDD and VDDANA to reach their desired value and for the control loops to lock on. It is important only that this takes place before the power on signal S2 changes over to normal operation.

In order to change over to normal operation, the switch SW1 changes its position and the switch SW2 closes, that is to say turns on. In addition, the starter circuit 3 is deactivated. The charge pumps 6 and 11 are now supplied from the output voltage VDD via the switch SW1, and the regulating operational amplifiers 5 and 10 and the bandgap reference circuit 4 are supplied from the output voltage VDDANA. The starter circuit 3 with its inaccurate output voltage UOUT is now no longer required. The starter circuit 3 is now reverse-fed via VDDANASTART via the output 3.3. However, all of the paths in the starter circuit 3 are deactivated as a result of the power on signal S2, with the result that no reverse current flows into the starter circuit 3.

Figure 2:
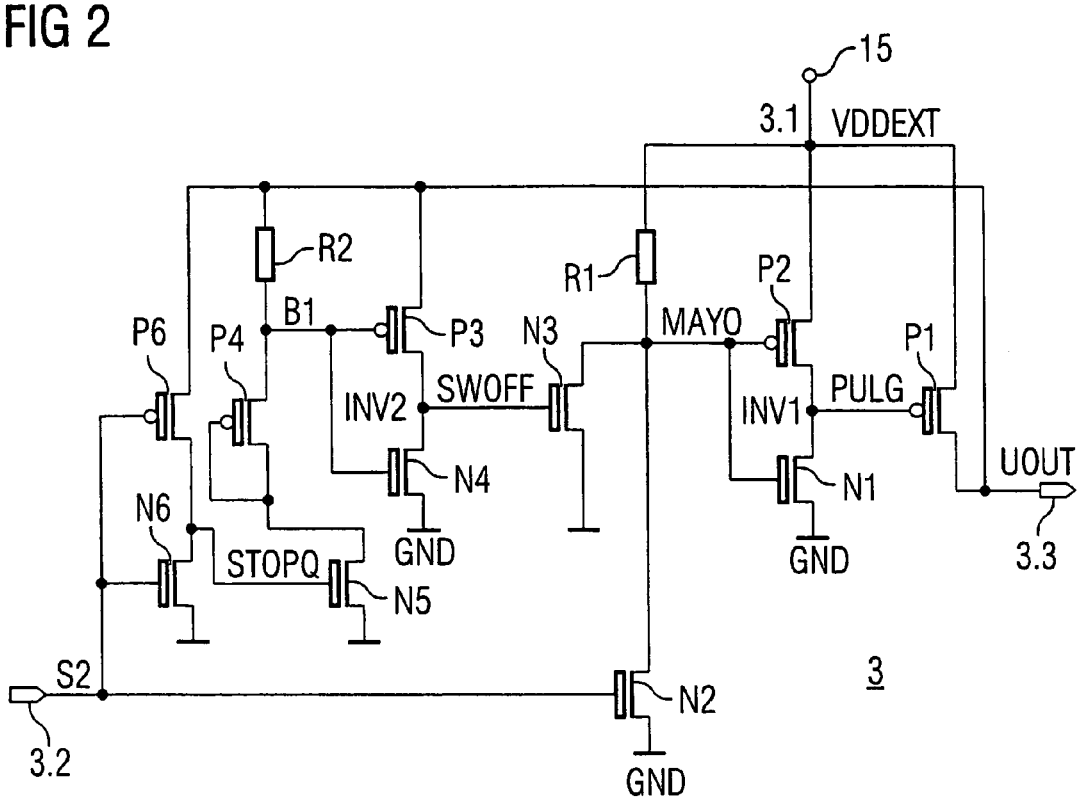
FIG. 2 shows the construction of the starter.

The starter unit 3 illustrated in FIG. 1 in the form of a block contains the starter circuit, which may be designed as illustrated in FIG. 2 and is explained in further detail below. Only the two PMOS transistors P1 and P2 and the resistor R1 are supplied from the external voltage VDDEXT. The transistors P1, P2, N1, N2 and N3 are in the form of high-voltage transistors since they may be loaded with the external voltage VDDEXT. All of the other transistors are low-voltage transistors since they see only the regulated voltage UOUT. During the switching-on operation, the resistor R1 ensures that the potential at the node MAYO is pulled up. The inverter INV1 comprising the PMOS transistor P2 and the NMOS transistor N1 provides a logic 0 at the node PULG and the transistor P1 is on. The output voltage UOUT of the starter circuit 3 now increases rapidly. The voltage at the node B1 is limited to approximately 0.6 V by the diode P4. The switching threshold of the inverter INV2 comprising the transistors P3 and N4 is set in such a manner that it is detected as a logic 1 up to an output voltage UOUT of approximately 1.5 V. As long as this is the case, the potential at the node SWOFF remains at 0 V. However, at an output voltage UOUT of greater than 1.5 V, the inverter INV2 detects the voltage at the node B1 as a logic 0 and provides a logic 1 at the node SWOFF. The transistor N3 thus pulls the node MAYO to 0 and the node PULG assumes the logic value 1, with the result that the transistor P1 turns off. As a result of the load at the output 3.3 of the starter circuit 3, the voltage falls again until the inverter INV2 toggles back again. Although the output voltage UOUT of the starter circuit 3 is thereby encumbered with a certain ripple, this does not play a role in the starting operation. During normal operation, all of the components are then supplied from the regulated output voltages VDD and VDDANA of the series regulators 1 and 2. The starter circuit 3 is then also switched off using the control signal S2 that is applied to its input 3.2. In this case, the node STOPQ assumes the logic state 0 and the transistor N5 prevents a shunt current through the resistor R2 and the transistor P4 that operates as a diode. The transistor N2 pulls down the potential at the node MAYO, with the result that the node PULG increases to the external voltage VDDEXT and the transistor P1 turns off completely. Although a small shunt current now flows via the resistor R1, reliable starting-up of the starter circuit 3 would not be ensured without the resistor R1.

The preceding description of the exemplary embodiments according to the present invention is used only to illustrate and not to restrict the invention. Various changes and modifications are possible within the context of the invention without departing from the scope of the invention and its equivalents.

What is claimed is:

1. A circuit arrangement for voltage regulation comprising:
   a series regulator which has a regulating amplifier and a charge pump that is connected downstream of the regulating amplifier;
   a reference voltage unit that generates a reference voltage for the regulating amplifier; and
   a starter unit that generates a starter voltage in order to supply the regulating amplifier, the charge pump, and the reference voltage unit with voltage while the series regulator is being started.

2. The circuit arrangement according to claim 1, wherein the series regulator has an NMOS transistor as a series regulator transistor.

3. The circuit arrangement according to claim 1, further comprising a first controllable switch that can connect the charge pump to the starter voltage or to an output voltage that is generated by the series regulator.

4. The circuit arrangement according to claim 1, further comprising a further series regulator whose supply voltage terminals can be connected to the starter unit.

5. The circuit arrangement according to claim 4, further comprising a second controllable switch that can connect the regulating amplifier to an output voltage that is generated by the further series regulator.

6. The circuit arrangement according to claim 1, wherein the reference voltage unit is in the form of a bandgap circuit.

7. The circuit arrangement according to claim 4, wherein the series regulator and/or the further series regulator are each in a form of a low-drop voltage regulator.

8. The circuit arrangement according to claim 1, wherein the starter unit has a two-point regulator.

9. The circuit arrangement according to claim 8, wherein the two-point regulator has, on the input side, a voltage divider having a resistor and a diode, and the switching point of the two-point regulator can be set using the voltage divider.

10. The circuit arrangement according to claim 9, wherein the two-point regulator has an NMOS transistor, a PMOS transistor, and an inverter, which is connected to the voltage divider.

11. The circuit arrangement according to claim 10, wherein the switching point of the two-point regulator can be set using the channel length and channel width of the NMOS and PMOS transistors.

12. The circuit arrangement according to claim 1, wherein the starter unit has a deactivation component that can deactivate the starter unit.

13. The circuit arrangement according to claim 12, wherein the deactivation component is controlled using the reference voltage unit.

14. Use of the circuit arrangement according to claim 1 in an integrated controller module.

15. A method for operating a voltage regulator, comprising the steps of:
   providing a series regulator having a charge pump that is connected downstream of a regulating amplifier;
   supplying the regulating amplifier and the charge pump, during a start phase, with a starter voltage that is generated by a starter unit;
   wherein, after the start phase has ended, a changeover is made to a normal operating phase by using a changeover unit to disconnect the regulating amplifier and the charge pump from the starter voltage of the starter unit and to connect the regulating amplifier and the charge pump to an output voltage that is generated by the series regulator.

16. The method according to claim 11, wherein a reference voltage unit is used to compare the starter voltage with a reference voltage that is generated by the reference voltage unit, and the changeover unit is driven in a manner dependent on the result of the comparison.

17. The method according to claim 15, wherein the starter unit is deactivated after the end of the start phase.

18. A circuit arrangement for voltage regulation comprising:
   a series regulating means having a regulating amplifier and a charge pump that is connected downstream of the regulating amplifier;
   a reference voltage means for generating a reference voltage for the regulating amplifier; and
   a starter means for generating a starter voltage in order to supply the regulating amplifier, the charge pump, and the reference voltage means with voltage while the series regulating means is being started.

19. The circuit arrangement according to claim 18, further comprising a first controllable switching means for connecting the charge pump to the starter voltage or to an output voltage that is generated by the series regulating means.

20. The circuit arrangement according to claim 18, further comprising a further series regulating means whose supply voltage terminals can be connected to the starter unit.

21. The circuit arrangement according to claim 20, further comprising a second controllable switching means that for connecting the regulating amplifier to an output voltage that is generated by the further series regulating means.

* * * * *

UNITED STATES PATENT AND TRADEMARK OFFICE
CERTIFICATE OF CORRECTION

| | | |
|---|---|---|
| PATENT NO. | : 7,301,318 B2 | Page 1 of 1 |
| APPLICATION NO. | : 11/340000 | |
| DATED | : November 27, 2007 | |
| INVENTOR(S) | : Gunter Haider et al. | |

It is certified that error appears in the above-identified patent and that said Letters Patent is hereby corrected as shown below:

In the Claims:

In Claim 21, line 13, "switching means that for" should read --switching means for--

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,301,318 B2 | Page 1 of 1 |
| APPLICATION NO. | : 11/340000 | |
| DATED | : November 27, 2007 | |
| INVENTOR(S) | : Gunter Haider et al. | |

It is certified that error appears in the above-identified patent and that said Letters Patent is hereby corrected as shown below:

In the Claims:

Column 8, Claim 21, line 13, "switching means that for" should read --switching means for--

This certificate supersedes the Certificate of Correction issued April 29, 2008.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO.       : 7,301,318 B2
APPLICATION NO.  : 11/340000
DATED            : November 27, 2007
INVENTOR(S)      : Gunter Haider et al.

It is certified that error appears in the above-identified patent and that said Letters Patent is hereby corrected as shown below:

On the front of the Patent:

Under (75) Inventors: it should read --Gunter Haider, Linz (AT); Christoph Mayerl, Munich (DE); Gerhard Nebel, Immenstadt (DE); Iker San Sebastian, Madrid (ES); Holger Sedlak, Sauerlach (DE); Uwe Weder, Hallertau (DE)--

Signed and Sealed this

Fourteenth Day of April, 2009

JOHN DOLL
*Acting Director of the United States Patent and Trademark Office*